United States Patent
Zhou et al.

(10) Patent No.: US 8,412,510 B2
(45) Date of Patent: Apr. 2, 2013

(54) METHODS AND APPARATUS TO DISPLAY LOCALIZED RESOURCES IN PROCESS CONTROL APPLICATIONS

(75) Inventors: Ling Zhou, Austin, TX (US); Cindy Scott, Georgetown, TX (US); Robert Burke Havekost, Elgin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 329 days.

(21) Appl. No.: 12/764,733

(22) Filed: Apr. 21, 2010

(65) Prior Publication Data

US 2011/0264440 A1 Oct. 27, 2011

(51) Int. Cl.
G06F 17/28 (2006.01)

(52) U.S. Cl. ............ 704/2; 704/3; 704/4; 704/5; 704/7; 704/8; 707/706; 707/707; 707/708; 715/264

(58) Field of Classification Search ............... 704/1–10; 707/706–708; 715/264
See application file for complete search history.

(56) References Cited

U.S. PATENT DOCUMENTS

| | | | |
|---|---|---|---|
| 5,572,668 A | 11/1996 | See et al. | |
| 5,652,884 A * | 7/1997 | Palevich | 713/1 |
| 5,664,206 A | 9/1997 | Murow et al. | |
| 5,754,858 A | 5/1998 | Broman et al. | |
| 6,073,090 A * | 6/2000 | Fortune et al. | 704/8 |
| 6,339,755 B1 * | 1/2002 | Hetherington et al. | 704/8 |
| 6,469,713 B2 * | 10/2002 | Hetherington et al. | 715/740 |
| 6,490,547 B1 | 12/2002 | Atkin et al. | |
| 6,859,820 B1 | 2/2005 | Hauduc et al. | |
| 6,865,716 B1 | 3/2005 | Thurston | |
| 6,993,568 B1 | 1/2006 | Hauduc et al. | |
| 7,007,026 B2 * | 2/2006 | Wilkinson et al. | 1/1 |
| 7,013,284 B2 | 3/2006 | Guyan et al. | |
| 7,318,087 B2 | 1/2008 | Hauduc et al. | |
| 7,369,984 B2 * | 5/2008 | Fairweather | 704/8 |
| 7,409,400 B2 * | 8/2008 | Ramarao | 1/1 |
| 7,552,452 B2 * | 6/2009 | McHugh et al. | 719/331 |
| 7,571,092 B1 | 8/2009 | Nieh | |
| 7,774,746 B2 * | 8/2010 | Mansfield et al. | 717/106 |
| 7,864,186 B2 * | 1/2011 | Robotham et al. | 345/581 |
| 7,882,116 B2 * | 2/2011 | Gutz et al. | 707/756 |
| 2002/0177993 A1 * | 11/2002 | Veditz et al. | 704/8 |

(Continued)

OTHER PUBLICATIONS

"Best Practices for Globalization and Localization in WPF," Windows Presentation Foundation User Education, Jul. 6, 2006, [retrieved from the Internet on Apr. 19, 2010]. Retrieved from the Internet: http://blogs.msdn.com/wpfsdk/archive/2006/07/06/best-practices-for globalization-and-localization, 3 pages.

"Localization Attributes and Comments," .NET Framework 4—Windows Presentation Foundation, 2010, [retrieved from the Internet on Apr. 19, 2010]. Retrieved from the Internet: http//:msdn.microsoft.com/en-us/library/ms753944(printer).aspx, 3 pages.

(Continued)

*Primary Examiner* — David R Hudspeth
*Assistant Examiner* — Lamont Spooner
(74) *Attorney, Agent, or Firm* — Hanley, Flight & Zimmerman, LLC

(57) ABSTRACT

Example methods and apparatus to display localized resources in a process control system are disclosed. A disclosed example method includes receiving in a server a locale identifier and a resource identifier from an application, identifying via the server a language file in a database that corresponds to the locale identifier, determining via the server using the language file a resource included within a memory that corresponds to the resource identifier, accessing the resource from the memory via the language file, and sending via the server the resource to the application to display the resource in a format associated with the locale identifier.

26 Claims, 9 Drawing Sheets

U.S. PATENT DOCUMENTS

| | | | |
|---|---|---|---|
| 2003/0115186 A1* | 6/2003 | Wilkinson et al. | 707/3 |
| 2004/0098246 A1* | 5/2004 | Welch et al. | 704/3 |
| 2004/0138871 A1* | 7/2004 | Edwards et al. | 704/8 |
| 2005/0076291 A1* | 4/2005 | Yee et al. | 715/513 |
| 2005/0240905 A1 | 10/2005 | Poutnasseh et al. | |
| 2006/0036570 A1* | 2/2006 | Schaefer et al. | 707/1 |
| 2006/0129522 A1* | 6/2006 | Itterbeck et al. | 707/1 |
| 2006/0293877 A1* | 12/2006 | Soor | 704/8 |
| 2006/0294463 A1* | 12/2006 | Chu et al. | 715/703 |
| 2007/0265827 A1* | 11/2007 | Wall et al. | 704/8 |
| 2008/0016049 A1* | 1/2008 | Dettinger et al. | 707/4 |
| 2008/0016466 A1* | 1/2008 | Grasser et al. | 715/835 |
| 2008/0249998 A1* | 10/2008 | Dettinger et al. | 707/4 |
| 2009/0083025 A1* | 3/2009 | Hauduc et al. | 704/8 |
| 2009/0276206 A1 | 11/2009 | Fitzpatrick et al. | |
| 2010/0174974 A1* | 7/2010 | Brisebois et al. | 715/223 |

OTHER PUBLICATIONS brunzefb, "Localizing WPF Applications using Locbaml," The Code Project, Jan. 25, 2007, [retrieved from the Internet on Apr. 19, 2010]. Retrieved from the Internet: http://www.codeproject.com/KB/WPFUsingLocbaml.aspx? display=Print, 20 pages.

Jayant Kulkarni, "Understanding satellite assemblies and using them in your application," Feb. 9, 2006, [retrieved from the Internet on Mar. 2, 2010]. Retrieved from the Internet: http://www.codeguru.com/csharp/.net/net_general/tipstricks/print.php/c11367, 3 pages.

"Satellite assemblies," .Net assembly—Wikipedia, the free encyclopedia, [retrieved from the Internet on Mar. 2, 2010]. Retrieved from the Internet: http://en.wikipedia.org/wiki/.Net_assembly, 1 page.

* cited by examiner

VALVE 01C PROPERTIES                                    [X]

NAME        | VALVE 01C |                 — 502
CLOSE %     | 0.35 |                      — 504
FLOW RATE   | 2.52 |                      — 506
DESCRIPTION | INFLOW VALVE TO TANK 1W3 |  — 508
            | /PID01/PR01/WR.VALVE01C |   — 510

( CANCEL )   ( REPLACE )   ( DONE )

FIG. 5A

VALVE 01C PROPRIÉTÉS                                    [X]

NOM         | VALVE 01C |                 — 552
FERMER %    | 0,35 |                      — 554
TAUX FLUX   | 2,52 |                      — 556
DESCRIPTION | VALVE CONFLUENT A RÉSERVOIR 1W3 | — 558
            | /PID01/PR01/WR.VALVE01C |   — 560

( CANCEL )   ( REPLACE )   ( FAIT )

FIG. 5B

METHODS AND APPARATUS TO DISPLAY LOCALIZED RESOURCES IN PROCESS CONTROL APPLICATIONS

FIELD OF THE DISCLOSURE

The present disclosure relates generally to process control systems and, more particularly, to methods and apparatus to display localized resources in process control applications.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Information from the field devices and the controllers may be made available to one or more applications (i.e., routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Additionally, the application stations and/or the operator workstations may implement applications that are configured (e.g., localized) for a language of the operator. Translator databases currently store translated phrases associated with information from field devices and controllers in text files. As part of a language build procedure for an application, a utility typically replaces localizable phrases (e.g., English language phrases) with translated phrases in another language and generates a resource file based on the translated phrases.

Furthermore, controllers and databases with resource files are generally configured with regional settings (e.g., a language setting) for a process control system and may only be able to use that configured regional setting. The controllers and the databases with resource files may need to be reconfigured to support other language settings. In other words, controllers and/or databases may handle only one locale specific requests from applications at a time within a single process control system and may require complete reconfiguration to be updated for different locales.

In many countries, personnel responsible for the operation of a process and personnel responsible for the maintenance of process control equipment may only be fluent in a local language. Additionally, there are some countries where there may be more than one prevalent language (e.g., English and French in Canada). Thus, one operator may only be fluent in French while another operator may only be fluent in English.

Controllers and/or databases are generally associated with a single locale, and an application accessing information generated by a controller may only display the information in a language associated with a locale assigned to the controller. Thus, if an application accesses multiple controllers distributed among multiple locales, multiple languages may be involved. Additionally, updating controllers to support language releases may be inefficient and/or time consuming because controllers may include relatively large amounts of control routines that reinitialize upon a language update or change. Further, updating controllers may include temporally stopping a process control system to update the controllers.

SUMMARY

Example methods and apparatus to display localized resources in process control applications are described. In one example, a method includes receiving in a server a locale identifier and a resource identifier from an application, identifying via the server a language file in a database that corresponds to the locale identifier, and determining via the server using the language file a resource included within a memory that corresponds to the resource identifier. The example method also includes accessing the resource from the memory via the language file and sending via the server the resource to the application to display the resource in a format associated with the locale identifier.

An example apparatus includes a locale processor to identify a language file in a database that corresponds to a locale identifier transmitted by an application. The example apparatus also includes a resource processor to determine via the language file a resource included within a memory that corresponds to a resource identifier transmitted by the application and to access the resource from the memory via the language file. Further, the example apparatus includes a renderer to send the resource to the application.

BRIEF DESCRIPTION OF THE DRAWINGS

FIGS. 5A and 5B show example user interfaces with a different localization applied by the example resource locator of FIG. 2.

DETAILED DESCRIPTION

Figure 1:
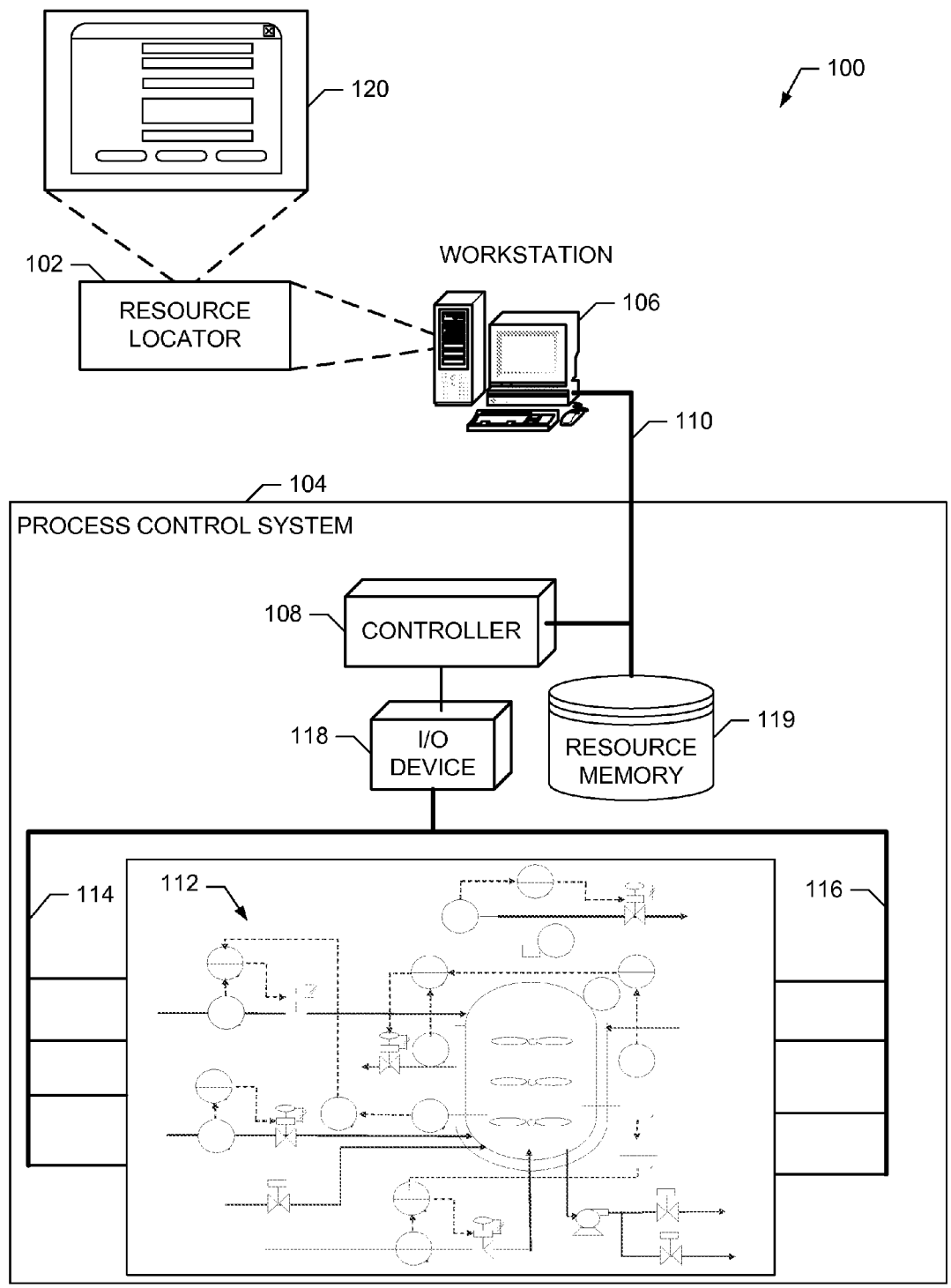
FIG. 1 shows a block diagram illustrating an example process control system including an example resource locator.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with displaying localized resources in a process control system, the example method and apparatus are more generally applicable and may be implemented to display localized resources associated with any automation system, batch processing system, manufacturing system, industrial control system, safety instrumented system, etc.

Process control systems generally include controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process control information based on data received from the field devices. The process control information (e.g., resources) may include process statistics, alarms, monitoring information, process trend information, diagnostic information, field device status information, and/or messages from the field devices.

The controllers may transmit process control information to applications operating on workstations so that operators may manage the process control system. Typically, applications display process control information as at least one data representation in a user interface. Data representations are helpful to operators by displaying process data graphically in the form of charts, graphs, data tables, list boxes, graphical symbols, text, etc. The data representations and corresponding text within the user interface are generally displayed in a format and/or language associated with a locale of an operator viewing the information. A locale of an operator may include a country, a language, a timezone, a geographic region, a cultural region, an ethnic region, etc.

Process control systems may be used in facilities throughout the world. For each country and/or region, personnel prefer to work in a familiar language (e.g., French, German, Japanese, Polish, etc.) and/or regional setting. Generally, for any process control system, there may be a variety of personnel with different levels of training and/or experience, which may be affected by a language used by the process control system. Additionally, a language preferred by these different personnel may not always be the same, even within the same facility. For example, an engineer may prefer to analyze a process in English, while an operator may prefer to monitor a process in Chinese.

Further, process control systems may be configured and/or diagnosed from remote locations. For example, a process control system in Japan may include applications and control routines designed in the United States. In this example, the United States personnel responsible for configuring or diagnosing issues within the system may be proficient in English while process control personnel in Japan may be proficient in Japanese. As a result of the language differences, the Japanese control system may be restricted from using diagnostic and configuration support in the United States. Additionally, sharing configuration information between the two languages may be difficult and inefficient. In many instances, the system may not be reconfigured to another language due to the time required to configure a process control system once a system is configured. Thus, any innovations developed on a new system may not be easily incorporated into the configuration of the original system.

Process control systems in different parts of the world may share common resources and/or system configuration information. However, these process control systems may be configured with different regional settings. Sharing information between control systems with different regional settings may be relatively difficult and time consuming. In some examples, information transmitted to a control system with a different regional setting may be converted prior to utilizing the information within the system. Further, converting information between different regional settings may result in issues from improperly converted information. For example, a value of 75,000 in a United States regional setting may be 75 (where the period is the decimal number separator and the comma is the thousands separator). In France, the same value may be represented as 75,000 (where the comma is the decimal number separator and the period id the thousands separator). The number 75.000 may not be converted to the corresponding proper value of 75,000. Without this conversion, the receiving control system may utilize a value that is 1000 times greater than expected.

To account for conversion issues, the text in many process control systems may be configured to be language neutral. In other words, these process control systems may use pointers (e.g., variable names) instead of natural language words. In some examples, pointers may be more difficult to maintain than words. Further, only a portion of a process control system may be configured to be language neutral due to configuration complexity. However, this portion of the process control system may be designed for a single language. Thus, a language neutral portion of a process control system may need to be translated for different languages.

Currently, translator databases store translated phrases associated with information from field devices and controllers in text files. As part of a language build procedure for a controller and/or a database, a utility replaces localizable phrases with translated phrases and generates a resource file based on the translated phrases. The controllers in the process control system are usually configured for one or more format(s) and/or language(s) based on the generated resource file(s). Additionally, controllers may include pointers within routines that access the resource files (e.g., translated language files, and/or phrases) within the databases. The controllers may include language specific functionality and/or may access language specific functionality in a database because control routines and/or algorithms within the controllers reference specific language text files or resource files. For example, if a controller detects an event that requires the transmission of an alarm to an application, instructions within the controller may instruct the controller to access a language text file or resource file associated with the alarm in a database. Further, the controller may be configured to process and/or format data based on a specified locale. The controller may transmit this formatted data associated with the alarm to the application. The formatted data may correspond to the locale of the translated phrase. For example, the data may be formatted for a European numbering standard if the translated phase is associated with a European language. In this manner, the controller and/or the database provide the translated text and data for applications.

Controllers that provide translated text and formatted data associated with a locale and/or language are typically designed and tested. These controllers may also be inefficient. In many instances, controller algorithms are designed to recognize different regional settings and/or text character sets. These algorithms may be tested to ensure that the number of formats are properly interpreted based on the current regional settings and that the programming logic of the algorithm is relatively robust with the various characters and/or settings. In many instances, a controller and/or a database that stores translated language files may need to be re-initialized every time a language or locale is changed so that controller instructions may be updated with pointers to the appropriate language files. Additionally, controllers and/or databases may need to be re-initialized as localizable phrases and translated text files are modified and/or expanded. Re-initialization of a controller may require stopping a process control system, which may cause lost revenue from stoppages in production. Further, a controller configured for one locale may not be capable of supporting multiple applications that may require displaying process control information (e.g., resources) in multiple languages (e.g., for operators and associated applications located in different parts of the world).

The example methods and apparatus described herein display localized resources or process control information in process control applications by separating controller functionality from locale specific language files and/or formats. In other words, the example methods and apparatus enable a language neutral controller by storing language resources and/or locale specific translated information within language packs (e.g., language files). Un-localized process control information may be stored by a controller to a resource memory using a resource identifier associated with the resource. Each language file may include a list of resources that correspond to information supported by the language file. The resources may include process control information transmitted by a controller and/or process control translation information. The process control translation information may include translated text strings that may describe a condition, instruction, command, an event, a status, a value, and/or any other text displayed within an application. Additionally, the process control translation information may include numeric formatting information. A language file database may store a group of language files, each associated with a different language (e.g., Spanish, French, German, English, etc.). Each language file may further include reference(s) (e.g., resource identifier(s)) to resources supported in that language.

The example methods and apparatus described herein may combine process control information stored within a resource memory by the controller with process control translation information stored in a language file and display the combined information as a resource within an application. In these examples, the process control information and the process control translation information may be associated with the same resource identifier within the language file. In other examples, the resources may be stored within a language file or, alternatively, may be stored in a resource memory.

In an example, a numeric value of a pump output may be assigned a resource identifier of PUMP01. A numeric value of 3.2 (e.g., process control information) may be stored by a controller to a memory. Different language files may include the PUMP01 resource identifier within a list of the resources supported by the language files. Additionally, each of the language files may include a translated text string and/or a specified format (e.g., process control translation information) for the PUMP01 resource identifier. An English language file may include a text string (e.g., process control translation information) "gallons/second Pump 01 Speed" that is associated with the PUMP01 resource identifier. An English language application may display the value of the pump (e.g., process control information) associated with the resource identifier for PUMP01 as a combination of the value of the PUMP01 resource identifier and the corresponding English test string (e.g., "3.2 gallons/second Pump 01 Speed)." Similarly, a Spanish language file may include a translated text string "galones/segundo Velocidad Bomba 01" that is associated with the PUMP01 resource identifier. Additionally, the Spanish language file may include a format modifier of the PUMP01 resource identifier to display a decimal number in the Spanish locale with a comma Thus, a Spanish language application may display the PUMP01 resource identifier associated with the Spanish locale as "3,2 galones/segundo Velocidad Bomba 01."

To retrieve resources to display within a user interface of an application, the example methods and apparatus described herein utilize a resource locator. The example resource locator may receive a locale identifier and a resource identifier from an application. The resource locator uses the locale identifier to select a language file and uses the resource identifier to select a corresponding resource within and/or associated with the language file. The resource locator may then render the resource for display within the application in a format and/or language associated with the requested locale identifier. Because the resource locator utilizes language files that reference resources (e.g., process control information) provided by the controller, the example controller and/or databases may be language neutral. Additionally, because the resource locator provides the user interface with information in the selected language, the user may not need to understand and/or use complex variables and pointers. Instead, the user may view and/or modify the information in the selected language.

In an example implementation, a controller may perform a routine that stores an alarm value with a resource identifier name of ALERT02. Additionally, the routine may include a variable that corresponds to the ALERT02 resource identifier. As the variable is updated by the controller based on process control conditions, the value of the ALERT02 resource identifier within the memory is updated with the value. Additionally, different language files may include different translated text strings (e.g., process control translation information) based on the value in the ALERT02 resource identifier. For example, if the ALERT02 resource identifier has a value of 5, an English language file may include a text string of "High Priority," a Spanish language file may include a translated text sting of "Alta Prioridad," and a German language file may include a translated text sting of "Hohe Priorität." Based on a locale identifier provided by an application, the resource locator may transmit a translated alarm message and the value of 5 (e.g., resources). Thus, the resource locator sends an application the appropriate translated text string stored in a language file and the language neutral value of 5 provided by the controller.

In some examples, the language files may be stored as satellite assemblies that may be accessed by the example resource locator using a .Net service and/or class. In these examples, resource identifiers and corresponding process control translation information may be stored within RtSting-Tables included within the .Net satellite assemblies. Additionally or alternatively, the language files may be stores as .resx resource files composed of Extensible Markup Language (XML) entries (e.g., references to resource identifiers and associated translation information). In other examples, the language files may be stored as .Net resource files. In yet other examples, the translation files may include criteria that the resource locator may use to translate resources. Current process control systems may utilize a language neutral controller by implementing the example resource locator and converting text and/or string files within the controller and/or databases to separate locale specific resource files.

By enabling a language neutral controller utilizing the example resource locator, the example methods and apparatus described herein enable multiple applications to access resources (e.g., process control information and/or process control translation information) in multiple languages. For example, a corporation may employ operators that speak different languages. In other instances, operators may access a control system remotely from multiple locales. The example methods and apparatus described herein enable these operators to view the same process control data concurrently in a language selected by the operator. Additionally, the example methods and apparatus enable an operator to switch a locale and/or language of an application relatively quickly without having to re-initialize a controller and/or language files in a database.

Further, by separating the controller from language files, updates and/or modifications to language files may be made without stopping the controller. Thus, language updates may be applied without affecting productivity, efficiency, and/or revenue generated from the operation of a control system. Additionally, because the language files (e.g., such as a language file in a .resx format) include text strings and corresponding resource identifiers, the language files may be relatively easily modified by any text editing application. While the example methods and apparatus are described implementing language files associated with Latin-based languages, the language files may also include other languages and/or dialects (e.g., Indian, Japanese, Chinese, Arabic, etc.).

FIG. 1 shows a block diagram of an example process control environment 100 including an example resource locator 102. The example resource locator 102 is part of a process control system 104. Additionally, the resource locator 102 may be implemented by and/or included within a workstation 106. In other examples, the resource locator 102 may be included within a server, a distributed computing network, and/or any other computing device(s) that may be communicatively coupled to the workstation 106.

The example workstation 106 of FIG. 1 may include any computing device such as a personal computer, a laptop, a server, a controller, a personal digital assistant (PDA), a micro computer, etc. The workstation 106 may be implemented using any suitable computer system or processing system (e.g., the processor system P10 of FIG. 8). For example, the workstation 106 could be implemented using a single processor personal computer, single or multi-processor workstations, etc.

The example process control system 104 may include any type of manufacturing facility, process facility, automation facility, safety instrumented facility, and/or any other type of process control structure or system. In some examples, the process control system 104 may include multiple facilities located at different locations. Additionally, the example process control environment 100 may include other process control systems (not shown) that may be included within the same facility and/or located at a different facility.

The example process control system 104 includes a controller 108 that may be communicatively coupled to the workstation 106 via a local area network (LAN) 110. The LAN 110 may be implemented using any communication medium and protocol. For example, the LAN 110 may be based on a hardwired or wireless Ethernet communication scheme. However, any other suitable communication medium and protocol could be used. Furthermore, although a single LAN 110 is shown, more than one LAN and appropriate communication hardware within the workstation 106 may be used to provide redundant communication paths between the workstation 106 and a respective similar workstation (not shown).

Additionally, the process control environment 100 may include routers (not shown) to communicatively couple other workstations (not shown) to the controller 108 and/or to communicatively couple the workstation 106 to controllers (not shown) within other process control systems. Further, the process control environment 100 may include a firewall (not shown) to provide remote workstations (e.g., workstations outside of the process control environment 100) access to resources within the process control environment 100.

The process control system 104 includes field devices 112 (e.g., input and/or output devices). The field devices 112 may include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure gauges, concentration gauges, fluid level meters, flow meters, and/or vapor sensors to measure portions of a process. The field devices 112 may receive instructions from the controller 108 via inputs 114 to execute a specified command and cause a change to the process implemented and/or controlled by the field devices 112. Furthermore, the field devices 112 measure process data, environmental data, and/or input device data and transmit the measured data via outputs 116 to the controller 108 as process control information. This process control information may include the values of variables corresponding to a measured output from each field device.

The process control system 104 also includes an I/O device 118 (e.g., one or more I/O cards) to receive data from the field devices 112 and convert the data into communications capable of being processed by the example controller 108. Likewise, the I/O device 118 may convert data or communications from the controller 108 into a data format capable of being processed by the corresponding field devices 112.

The example controller 108 of FIG. 1 is language neutral and operates one or more control routines (e.g., process control algorithms, functions, and/or instructions) to manage the field devices 112 within the process control system 104. The control routines may include process monitoring applications, alarm management applications, process trending and/or history applications, diagnostic applications, batch processing and/or campaign management applications, statistical applications, streaming video applications, advanced control applications, safety instrumented applications, etc. Furthermore, the controller 108 forwards process control information (e.g., resources) to a resource memory 119 (e.g., a database). The controller 108 may forward process control information to the resource memory 119 at periodic intervals and/or upon processing or generating process control information. The resources transmitted by the controller 108 to the resource memory 119 may include process control values, data values, alarm information, text, status information, diagnostic information, error messages, parameters, events, and/or device identifiers.

The example workstation 106 and/or other workstations with access to the process control system 104 may be configured to view, modify, and/or correct one or more processes within the process control system 104 via one or more applications. Applications may include an enterprise view application, a graphics studio application, an explorer application, and/or any other type of process control-based application. These applications display information within the workstation 106 via one or more user interfaces 120, which formats, manages, and/or displays process control information provided by the resource locator 102. The user interface 120 may include a graphical window that may be displayed within the workstation 106 to show one or more resources displayed as graphical representation(s) (e.g., functional block diagrams and/or schematics). The workstation 106 may be capable of displaying more than one user interface 120 that may be communicatively coupled to the resource locator 102.

The example user interface 120 of FIG. 1 shows a status display of a field device included within the process control system 104. To display the status display, the user interface 120, via a corresponding application, may transmit a locale identifier and/or at least one resource identifier to the resource locator 102. The resource identifiers(s) correspond to resources specified to be displayed within the status display. The application may transmit the locale and resource identifiers upon an initiation of the application on the workstation 106, during a rendering of the application on the workstation 106, and/or upon an operator selecting a different locale. The locale identifier may be selected by an operator based on his language preference to view resources. In other examples, the locale identifier may be identified by regional settings within the workstation 106. The resource identifiers are selected based on which resources the user interface 120 is to display. For example, an application for status display may include a list of resource identifiers that correspond to information the application is to display. The application may also indicate locations within the application to display the resources, formats for displaying the resources, and/or graphical data representations of the resources.

Upon receiving the locale and resource identifiers, the example resource locator 102 accesses a language file database to find a language file that matches the locale identifier. In some examples, the language file database may be locally stored within the resource locator 102 and/or the workstation 106. In other examples, the language file database may be stored at a central location within the process control system 104 and/or the process control environment 100. The language file database includes language files (e.g., language packs in a satellite assembly format) for languages supported by the process control environment 100. The example resource locator 102 matches the locale identifier to a language file by comparing the language, region, and/or country specified by the locale identifier to names of the language files. For example, a locale identifier that specifies "Spain" may be matched by the resource locator 102 to a Spanish language file.

Additionally, the language files include a list of resource identifiers of resources supported by the language. The language files may also include links and/or references of the resources to locations within the resource memory 119. Further, the language files may include process control translation information such as, for example, text strings, that are associated with corresponding process control information stored in the resource memory 119. In other examples, the process control translation information may be stored with the process control information as resources within the resource memory 119.

The example resource locator 102 of FIG. 1 uses the matched language file to determine if the received resource identifier(s) are included within the language file. If the resource identifier(s) are included within the language file, the resource locator 102 uses a reference of each of the resource identifiers within the language file to access the corresponding resources (e.g., process control information) in the resource memory 119. Additionally, the resource locator 102 may use the resource identifiers to access locally stored corresponding resources (e.g., process control translation information). The resource locator 102 may then combine a resource associated with a resource identifier accessed from the resource memory 119 with a corresponding text string resource within the language file and transmit the combined resource to the user interface via the application. In some examples, the resource locator 102 may render the combined resource prior to transmitting the resource.

In examples where the resource locator 102 is unable to match the locale identifier to a language file, the resource locator 102 may access a default language file. Additionally, the resource locator 102 may access a default language file if the resource locator 102 is unable to match resources within a language file to resource identifiers. A process control designer and/or engineer may specify the default language file. The resource locator 102 may search the default language file for resources matching the resource identifier. In some examples, the resources may be stored in a default memory. In other examples, the resources may be stored within the resource memory 119. In yet other examples, the default memory may be included within the resource memory 119.

In some examples, the resource locator 102 may use a language file to translate resources and/or portions of resources. Translating resources may include accessing a text sting in a default language file and using translation tables within a language file associated with a specified locale to translate the text string. In another example, the resource locator 102 may translate resources by formatting data values based on format translation information within a language file (e.g., substituting a decimal with a comma to convert an American decimal number to a European formatted number).

The resource locator 102 provides resources for display within the user interface 120 based on received locale identifiers. Thus, multiple resource locators 102 operating within and/or in conjunction with workstations may access the resource memory 119 and/or language file database(s) to provide resources in languages requested by the applications. In this manner, the example resource locator 102 enables process control information to be displayed simultaneously in any supported language without re-initializing the controller 108 and/or the resource memory 119 each time resources are requested to be displayed in a different language. Additionally, an operator at the workstation 106 may change a locale, thereby causing the resource locator 102 to access resources associated with the newly specified locale. The resource locator 102 may relatively quickly update the user interface 120 with resources associated with the specified language by locating, accessing, rendering, and transmitting the resources.

In addition to providing the user interface 120 with resources during operation of the process control system 104, the example resource locator 102 may also be implemented during development of the process control system 104 and/or during development of process control applications operating on the workstation 106. The resource locator 102 accesses resources associated with a received locale identifier and, as a result, test language files may be used to determine if localization functions of an application are functioning properly. In these examples, the application may send the resource locator 102 a test locale identifier specifying a test language file. Using the resource locator 102 to develop applications may help developers detect potential localization issues, which may reduce costs of localization development.

Figure 2:
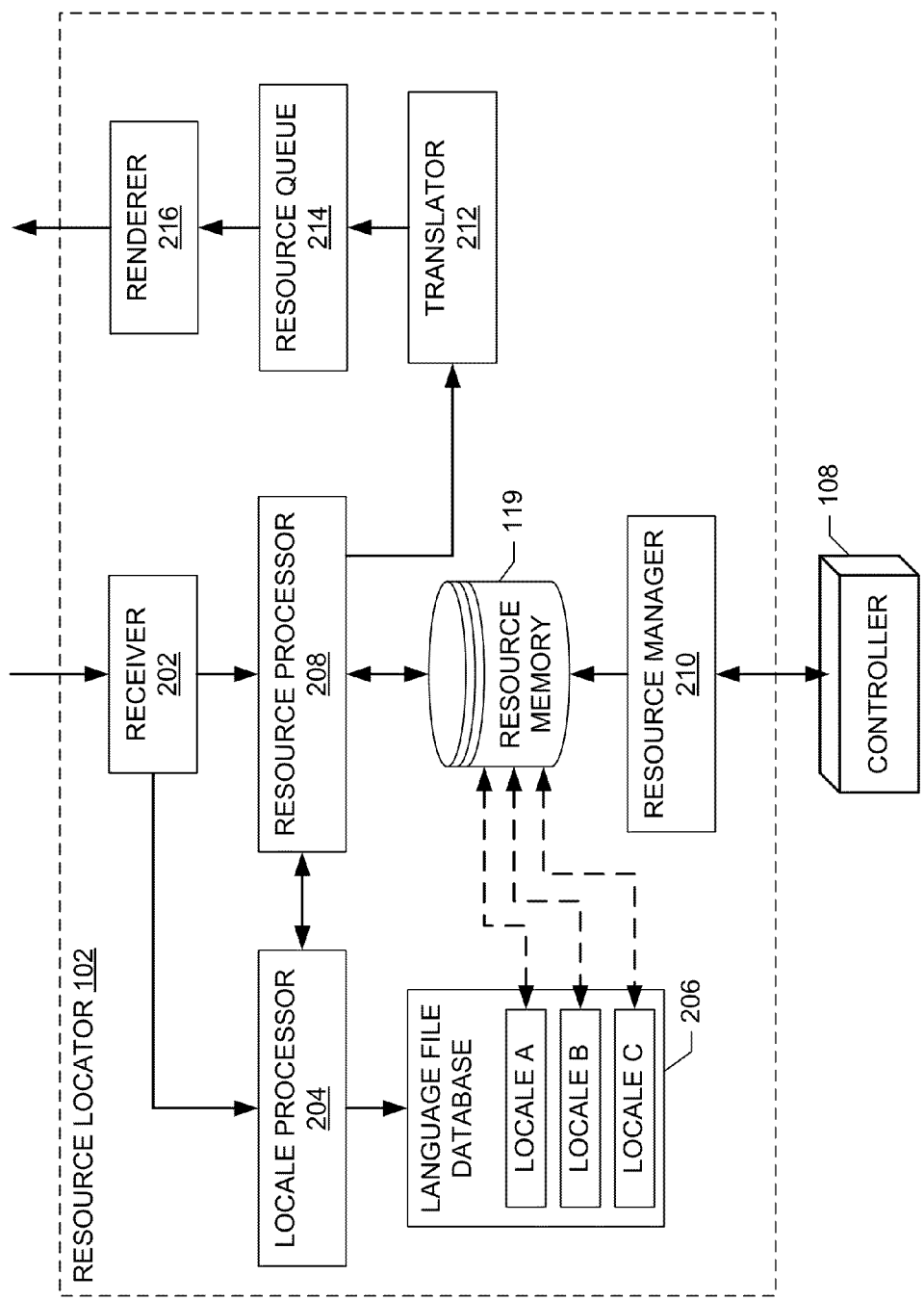
FIG. 2 shows a functional block diagram of the example resource locator of FIG. 1.

FIG. 2 is a functional block diagram of the example resource locator 102 of FIG. 1. While the examples described below include a single resource identifier, the resource locator 102 may process multiple resource identifiers requested by an application. To receive locale identifiers, resource identifiers, and/or any other information from applications, the example resource locator 102 includes a receiver 202. The example receiver 202 may be communicatively coupled to one or more workstations within a process control system. Upon receiving locale identifiers and/or resource identifiers from an application, the example receiver 202 forwards the identifiers to a locale processor 204. Additionally, the receiver 202 may forward to the locale processor 204 other application information such as, for example, application initiation messages or application status messages. Additionally, the receiver 202 may send an application an acknowledgment message to indicate the receiver 202 received the identifiers and/or information messages.

To identify a language file associated with a received locale identifier, the example resource locator 102 includes the locale processor 204. In addition, the locale processor 204 may create language files and/or assign resources to a language file. The example locale processor 204 receives locale and resource identifiers from the receiver 202 and accesses a language file database 206 to locate a language file (or language pack) that matches a received locale identifier. Additionally, the locale processor 204 uses the received resource identifier to determine if a matching language file includes and/or supports an associated resource. If the locale processor 204 determines that a language file includes a corresponding resource, a reference to a resource located in the resource memory 119, and/or a listed resource identifier, the locale processor 204 transmits the resource identifier and/or the language file to a resource processor 208 to access the resource from the resource memory 119.

The locale processor 204 may match a resource identifier to a listed resource in a language file by matching a namespace of a resource to the resource identifier. A namespace of a resource is a descriptive file name and/or memory location of a resource that includes a resource identifier. In other examples, the namespace may be the same as a file name of a resource. For example, a namespace of a resource may include the file name PID04/LINE02/PUMP01 and a resource identifier of PUMP01. The locale processor 204 may use the namespace of the file name to relatively quickly locate and/or match the resource identifier to the file name listed within a language file. Additionally, because the namespace may correspond to a location within the resource memory 119, the resource processor 208 may use the namespace of a resource to relatively quickly locate a resource within the resource memory 119.

The example locale processor 204 of FIG. 2 may also identify resources (e.g., process control translation information) such as, for example, translated text strings included within and/or associated with the resource identifier located within a matching language file. Upon identifying the process control translation information, the locale processor 204 may forward the translation information to the resource processor 208. However, if the locale processor 204 determines that the locale identifier does not match a language file or the resource identifier is not included within a matched language file (e.g., a Locale A language file), the locale processor 204 accesses a default language file (e.g., a Locale C language file).

The language file database 206 and the resource memory 119 may be implemented by Electronically Erasable Programmable Read-Only Memory (EEPROM), Random Access Memory (RAM), Read-Only Memory (ROM), and/or any other type of memory. Additionally, while FIG. 2 shows the language file database 206 and the resource memory 119 located within the resource locator 102, the language file database 206 and/or the resource memory 119 may be located in at least one database separate from the resource locator 102.

To locate and/or determine resources within the resource memory 119, the example resource locator 102 includes the resource processor 208. The example resource processor 208 may receive a language file and/or an identifier of a language file from the locale processor. The resource processor 208 may also receive resource identifier(s), translation information associated with resource identifier(s), and/or locations within the resource memory 119 of resource(s) corresponding to resource identifier(s). In other examples, the resource processor 208 may receive resource identifiers from the receiver 202. In these examples, the resource processor 208 may queue these resource identifiers until a language file or an identifier of a language file is provided by the locale processor 204.

Using the received resource identifiers and language file, the resource processor 208 accesses the resource memory 119 and determines resources (e.g., process control information) that correspond to the resource identifiers. The example resource processor 208 may determine resources by matching each resource identifier to a namespace of a file name of a resource. The resource processor 208 then accesses the matching resources from memory and resolves the resources with any corresponding information within the associated language file. Resolving the resources may include combining resources (e.g., process control information) from the resource memory 119 with corresponding resources (e.g., process control translation information) within a language file. In other words, the resource processor 208 may combine a first portion of resources located in the resource memory 119 associated with a resource identifier with a second portion of resources located in a language file associated with the same resource identifier.

To store resources (e.g., process control information) within the resource memory 119, the example resource locator 102 includes a resource manager 210. The example resource manager 210 is communicatively coupled to the controller 108 and receives process control information from the controller 108. The resource manager 210 stores process control information to an appropriate location within the resource memory 119. In some examples, the resource manager 210 may also notify the resource processor 208 of updates and/or newly added process control information. Upon receiving this notification, the resource processor 208 may update resources displayed within a user interface.

In some examples, the resource manager 210 may periodically receive process control information from the controller 108. In other examples, the resource manager 210 may receive process control information as the controller 108 processes and/or generates the information. In yet other examples, the resource manager 210 may poll, request, and/or ping the controller 108 for process control information.

Additionally, in some instances, the process control information received by the resource manager 210 may include a resource identifier, data values, a functional location within a routine of the controller 108, and/or a memory location within the resource memory 119. In these instances, the resource manager 210 uses the file information to select the appropriate location within the resource memory 119 to store the process control information. In other instances, the controller 108 may include instructions that point to a location within the resource memory 119 to store process control information. In these instances, the resource manager 210 functions as a pass-through for the process control information as the controller 108 writes the process control information (e.g., resources) to the resource memory 119. In yet other instances, the resource processor 208 may bypass the resource memory 119 and/or the resource manager 210 and determine and access process control information (e.g., resources) directly from the controller 108.

To translate resources accessed by the resource processor 208, the example resource locator 102 of FIG. 2 includes a translator 212. The example translator 212 translates resources based on information within and/or associated with a language file of resources. The translator 212 may translate resources by formatting a numerical value and/or a text string based on preferences and/or language rules specified within a language file. For example, the translator 212 may convert a value of 3.2 to 3,2 to adhere to the European numbering format.

In other examples, when a language file does not include a translated text string resource and/or a default text string resource is utilized, the example translator 212 may translate the text string or access a translated text string based on a translation lookup table and/or translation rules included within a language file associated with a requested locale identifier. However, in examples when substantially all text strings are translated and included within a language file and/or the resource processor 208 is provided numeric value format functionality, the resource locator 102 may not include the translator 212.

To store translated resources (e.g., process control information and/or process control translation information) prior to sending the resources to an application, the example resource locator 102 includes a resource queue 214. The example resource queue 214 receives resources from the translator 212. Additionally, in some examples, the resource queue 214 may receive resources from the resource processor 208. The resource queue 214 may store resources until all of the resources for an application are available to send to the application. The resource queue 214 may also store resources until an application and/or a user interface is rendered and/or initialized to receive resources. Alternatively, the resource queue 214 may store resources until a threshold is reached. Upon reaching a threshold, the resource queue 214 may transmit the group of resources for display in an application. In other examples, the translator 212 and/or the resource processor 208 may transmit resources as the resources are translated and/or accessed. In these examples, the resource locator 102 may not include the resource queue 214.

To render resources, the example resource locator 102 of FIG. 2 includes a renderer 216. The example renderer 216 may receive resources from the resource queue 214, the translator 212 and/or the resource processor 208. Upon receiving the resources, the renderer 216 processes the resources for display in an application and/or user interface that requested the resources. The renderer 216 may process the resources by formatting the resources such that they are displayed within a reassigned layout within a user interface. Processing the resources may also include generating a displayable version of the resource based on a type of the resource and/or display information included within the resource. For example, rendering may include generating and placing resources into charts, graphs, tables, etc. for display within a user interface. In some examples, an application and/or workstation may render resources. In these examples, the resource locator 102 may not include a renderer 216.

While an example manner of implementing the resource locator 102 is depicted in FIG. 2, one or more of the interfaces, data structures, elements, processes and/or devices illustrated in FIG. 2 may be combined, divided, rearranged, omitted, eliminated and/or implemented in any other way. For example, the example receiver 202, the example locale processor 204, the example language file database 206, the example resource processor 208, the example resource memory 119, the example resource manager 210, the example translator 212, the example resource queue 214, and/or the example renderer 216 illustrated in FIG. 2 may be implemented separately and/or in any combination using, for example, machine-accessible, machine readable, or non-transitory instructions executed by one or more computing devices and/or computing platforms (e.g., the example processing platform P10 of FIG. 8).

Further, the example receiver 202, the example locale processor 204, the example language file database 206, the example resource processor 208, the example resource memory 119, the example resource manager 210, the example translator 212, the example resource queue 214, the example renderer 216, and/or more generally, the example resource locator 102 may be implemented by hardware, software, firmware and/or any combination of hardware, software and/or firmware. Thus, for example, any of the example receiver 202, the example locale processor 204, the example language file database 206, the example resource processor 208, the example resource memory 119, the example resource manager 210, the example translator 212, the example resource queue 214, the example renderer 216, and/or more generally, the example resource locator 102 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 3:
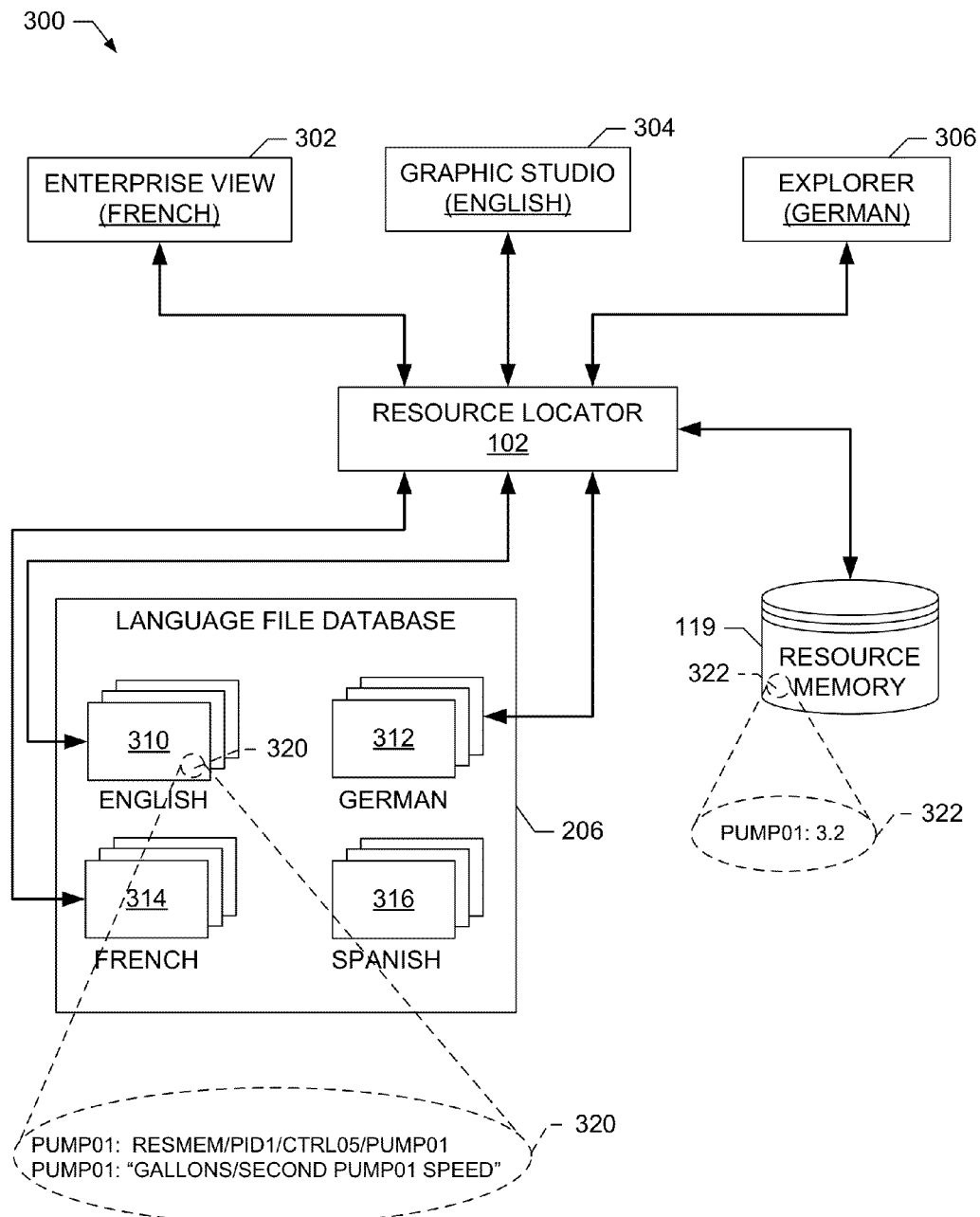
FIG. 3 shows an example implementation of the resource locator of FIGS. 1 and 2.

FIG. 3 shows an example implementation of the resource locator 102 of FIGS. 1 and 2 in a multiple application environment 300. The example multiple application environment 300 includes an enterprise view application 302 displaying resources in French, a graphic studio application 304 displaying resources in English, and an explorer application 306 displaying resources in German. Each of the applications 302-306 may be displayed via a user interface on a workstation. Additionally, each of the applications 302-306 may concurrently or simultaneously access the same resources stored within the resource memory 119. The applications 302-306 may be operating on workstations within the same process control facility or, alternatively, within process control facilities located within different countries, regions, cities, etc.

The example multiple application environment 300 shows that the applications 302-306 are communicatively coupled to the example resource locator 102 of FIGS. 1 and 2. In other examples, each of the applications 302-306 may access separate resource locators, with each resource locator communicatively coupled to the resource memory 119 and the language file database 206. The example language file database 206 includes the language files 310-316. In other examples, the language file database 206 may include additional language files (e.g., Japanese, Polish, etc.) or fewer language files. Each of the language files 310-316 may be stored within the language file database 206 as satellite assemblies. In other examples, the language files 310-316 may be stored as language packs in a .resx format. The example language files 310-316 may include resources (e.g., process control translation information), references to resources within the resource memory 119, translation tables, resource identifier lists, and/or regional formatting tables for numerical values.

The example multiple application environment 300 of FIG. 3 shows that the example resource locator 102 utilizes the English language file 310 for the graphic studio application 304, the German language file 312 for the explorer application 306, and the French language file 314 for the enterprise view application 302. The resource locator 102 does not utilize the Spanish language file 316 because the applications 302-306 have not requested resources in Spanish. However, the Spanish language file 316 may be accessed by the resource locator 102 if any of the applications 302-306 change to a Spanish locale. Further, the example resource locator 102 may support additional types of applications. While the resource locator 102 accesses the language files 310-314, other resource locators may concurrently access the same language files 310-314.

The example English language file 310 includes a resource 320 that is expanded for clarity. The example resource 320 includes process control translation information (e.g., Gallons/Second PUMP01 Speed) and a file path of an associated resource 322 that includes process control information located within the resource memory 119. The resource 320 also includes a listing of a resource identifier, PUMP01. The process control translation information is shown as a text sting that may be provided by a process control engineer and/or designer to describe the process control information referenced by the file path.

The file path includes a namespace (e.g., PID1/CTRL05/PUMP01) that corresponds to the resource identifier PUMP01. This namespace may be used by the resource locator 102 to more easily locate the resource 322 within the resource memory 119 and/or to more easily locate the resource 320 within the language file 310. In other examples, the resource locator 102 may match the PUMP01 resource identifier to a listing of the identifier within the resource 320 (e.g., PUMP01:). Upon determining the file path, the resource locator 102 may access the resource memory 119 and locate the resource 322. Alternatively, the resource locator 102 may search the resource memory 119 using the PUMP01 resource identifier. The resource locator 102 may then combine the resources 320 and 322, queue the resources 320 and 322, render the resources 320 and 322, and/or transmit the resources 320 and 322 to the graphic studio application 304. The graphic studio application may display the resources 320 and 322 that correspond to the PUMP01 resource identifier as "3.2 Gallons/Second—Pump01 Speed."

Figure 4:
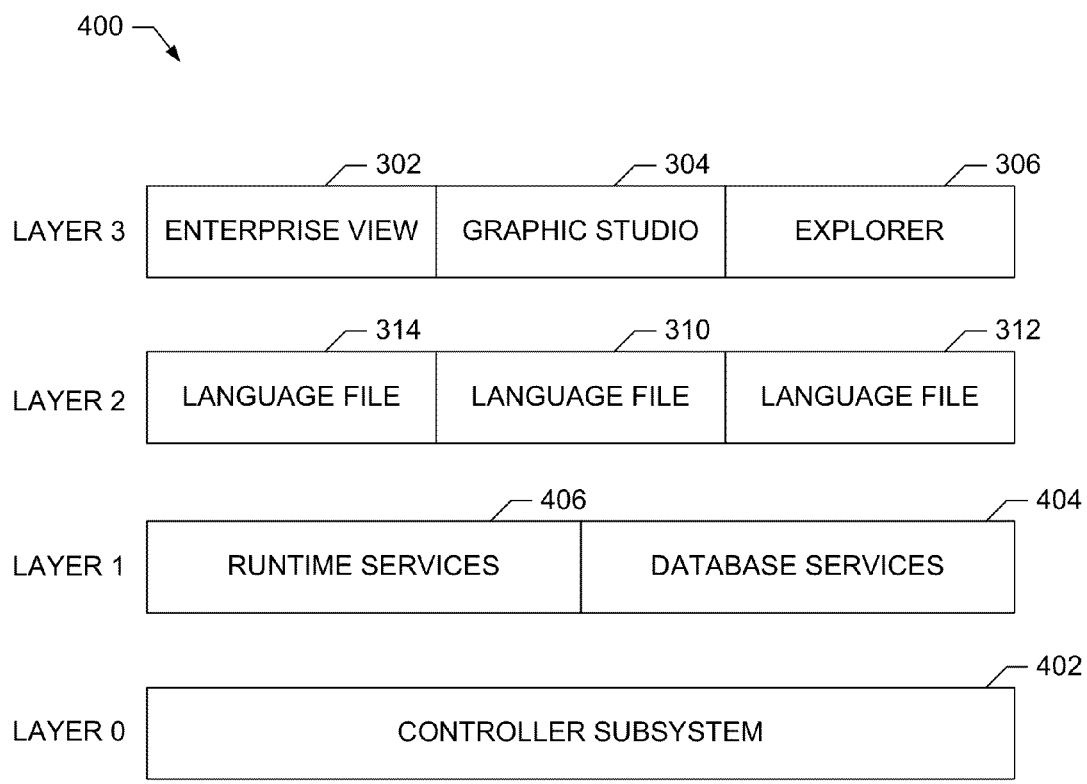
FIG. 4 shows an example process control architecture utilizing the resource locator of FIGS. 1, 2, and/or 3.

FIG. 4 shows an example process control architecture 400 utilizing the resource locator 102 of FIGS. 1, 2, and/or 3. The example process control architecture 400 includes the applications 302-306 and the language files 310-314 described in conjunction with FIG. 3. In other examples, the process control architecture 400 may include additional applications, fewer applications, different application types, additional language files, fewer language files, and/or other language files.

The example process control architecture 400 of FIG. 4 shows a functional relationship between generating process control data via a controller subsystem 402 (e.g., layer 0) and displaying the process control data as translated resources within applications 302-306 (e.g., layer 3). This functional relationship enables a language neutral controller (e.g., the controller 108) by positioning the language files 310-314 functionally immediately beneath the applications 302-306. While the example resource locator 102 is not shown in FIG. 4, the example resource locator 102 interfaces with each of the layers 0-3 as described in conjunction with FIGS. 1-3.

To receive, process, and generate process control information (e.g., resources) the process control architecture 400 includes the controller subsystem 402. The controller subsystem 402 may also include routines, algorithms, and/or any other database or process control information processing component. Functionally above the controller subsystem 402 are data services 404 and runtime services 406. The runtime services 402 utilize process control information within process monitoring applications, analysis applications, status applications, and/or any other type of application(s). The runtime services 402 may also configure process control information into graphical representations for display within applications. The database services 404 may store process control information generated by the controller subsystem 402. For example, the database services 404 may include the resource memory 119. The database services 404 may also include other process control configuration files, resources, and/or databases of data formatting information.

Functionally above the runtime services 406 and the database services 404 are the language files 310-314. The language files 310-314 may be used to covert process control resources stored within the database services 404 into a format and/or language requested by the applications 302-306 in layer 3. The language files 310-314 may also include process control translation information specific for each language file. In this manner, localization occurs with the language files 310-314 at layer 2 while the controller subsystem 402 and the services 404 and 406 within the respective layer 0 and layer 1 are language neutral. Thus, language specific resources requested by the applications 302-306 may be provided to the applications 302-306 via the resource locator 102 utilizing the language files 310-314 to access and/or translate the language neutral resources generated and stored by the controller subsystem 402 and the services 404 and 406.

FIGS. 5A and 5B show example user interfaces 500 and 550 with a different localization applied by the example resource locator of FIGS. 1, 2, and/or 3. Specifically, the user interfaces 500 and 550 show properties including process control information and process control translation information (e.g., resources) associated with a valve (e.g., a field device) with a resource identifier of VALVE01C. The example user interface 500 of FIG. 5A is shown in the English language and includes data fields 502-510. The example user interface 550 of FIG. 5B is shown in the French language and includes data fields 552-560. The data fields 502 and 552 specify a name of the valve, the data fields 504 and 554 specify a closure percentage of the valve, the data fields 506 and 556 specify a fluid flow rate through the valve, the data fields 508 and 558 specify a description of the valve, and the data fields 510 and 560 specify a file location of the resources associated with the valve.

In the example of FIG. 5A, an English language file includes process control translation information associated with the VALVE01C resource identifier. This translation information includes text strings (e.g., NAME, VALVE 01C, CLOSE %, FLOW RATE, DESCRIPTION, INFLOW VALVE TO TANK 1W3, CANCEL, REPLACE, and/or DONE) that provide descriptions of corresponding resources associated with the VALVE01C resource identifier. The English language file may also include the file location (e.g., /PID01/PRO1/WR.VALVE01C) that points to a location of corresponding process control information (e.g., resources) within the resource memory 119. In this example, the process control information may include the values 0.35 and 2.52 transmitted by the valve.

In other examples, each of the data fields may be associated with a resource that corresponds to a resource identifier of the data field. For example, the data field 506 may correspond to a VALVE01C FR resource identifier. In this example, the English language file includes the text string FLOW RATE. Similarly, the French language file may include the text string TAUX FLUX for the VALVE01C FR resource identifier.

In an example, a first operator may be viewing the user interface 500 of FIG. 5A. Then, during a shift change, a second operator may change the locale of the user interface 500 to French. The example resource locator 102 receives the French locale identifier and converts the user interface 500 into the user interface 550 of FIG. 5B. To generate the user interface 550, the resource locator 102 may receive the VALVE01C resource identifier from the corresponding application. Upon receiving the locale and resource identifiers, the resource locator 102 accesses the French language file, locates the process control translation information associated with the VALVE01 resource identifier (e.g., NOM, FERMER %, TAUX FLUX, etc.), and locates the file path. The resource locator 102 then accesses the resource memory 119 using the file path and locates the 0.35 and 2.52 process control values (e.g., resources). The resource locator 102 may then convert (e.g., format) the values into 0.35 and 2.52 based on translation information within the French language file specifying numeric formats. The resource locator 102 may then combine the text stings with the process control values and transmit the resources to the user interface 550 for display.

The example text stings shown in FIGS. 5A and 5B may be created by process control engineers and/or designers. The engineers and/or designers may use translation tools (e.g., Alchemy Catalyst 8.0) to generate the translated text strings stored in translation files. Additionally, the text strings may be optimized for the user interfaces 500 and 550 by implementing the user interfaces 500 and 550 in the Extensible Application Markup Language (XAML). XAML may also enable the user interfaces 500 and 550 to incorporate resources transmitted by the resource locator 102 and to application programming interfaces (APIs). Additionally, the layout of resources within the user interfaces 500 and 550 may be based on relative positioning and/or automatic sizing of the data fields 502-510 and 552-560. Further, layout of the data fields 502-510 and 552-560 may include providing extra space so that longer localizable phrases are not obscured. Further, the layout of the data fields 502-510 and 552-560 may include text wrapping to prevent clipping.

Additionally, an xml:lang attribute may be set for the user interfaces 500 and 550 so that hyphenation, spell checking, number substitution, script shaping, and/or font fallback are associated with a specified locale. Also, each of the user interfaces 500 and 550 may specify a composite font and a text flow direction for displaying the text strings. Furthermore, each of the user interfaces 500 and 550 may have a specified default language.

Figure 6A:
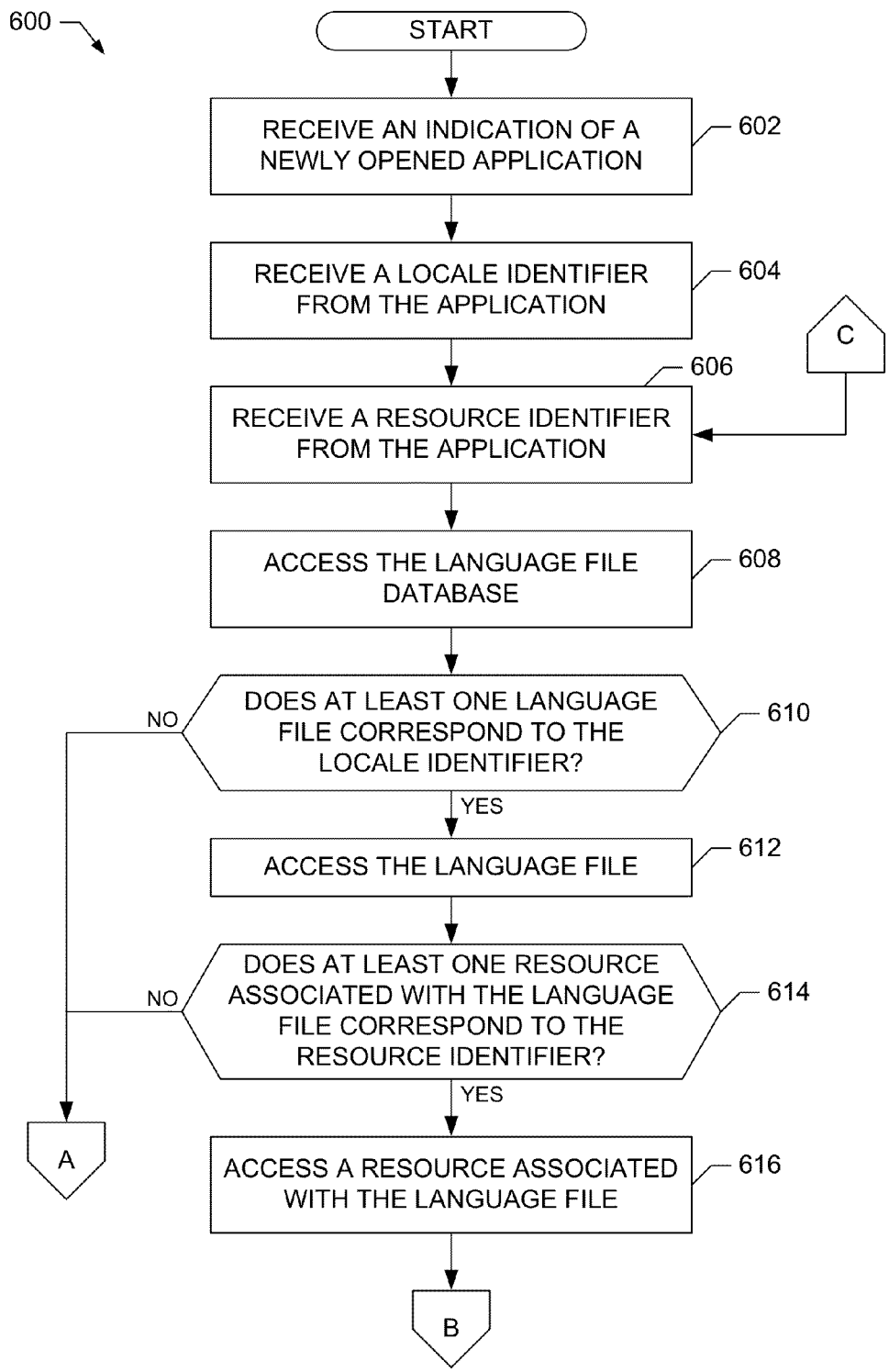
FIGS. 6A, 6B, and 7 are flowcharts of example methods that may be used to implement the example resource locator, an example locale processor, an example resource processor, an example receiver, an example language file database, an example resource memory, an example translator, an example resource queue, and/or an example renderer of FIGS. 1 and/or 2.
Figure 6B:
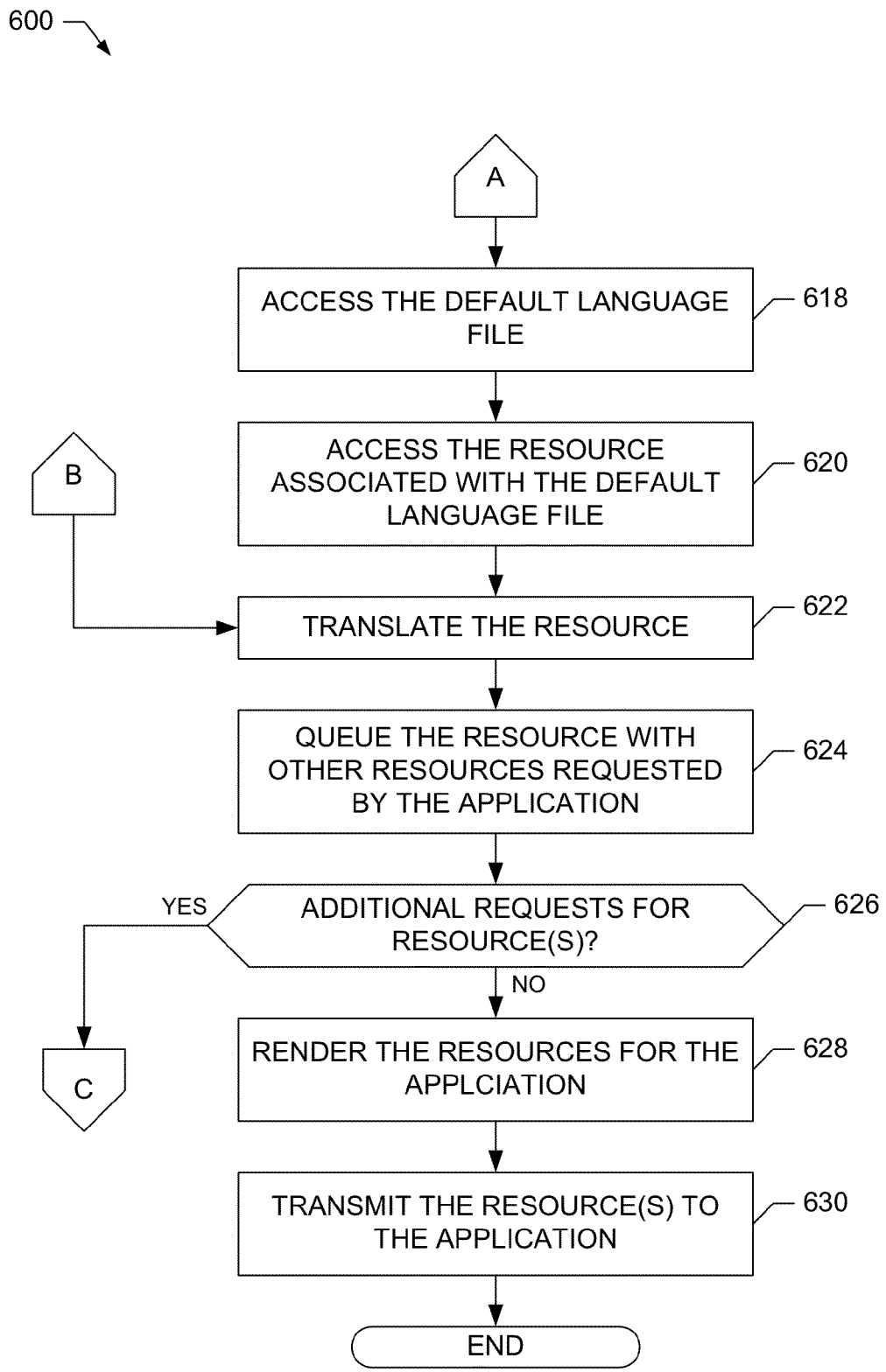
Figure 7:
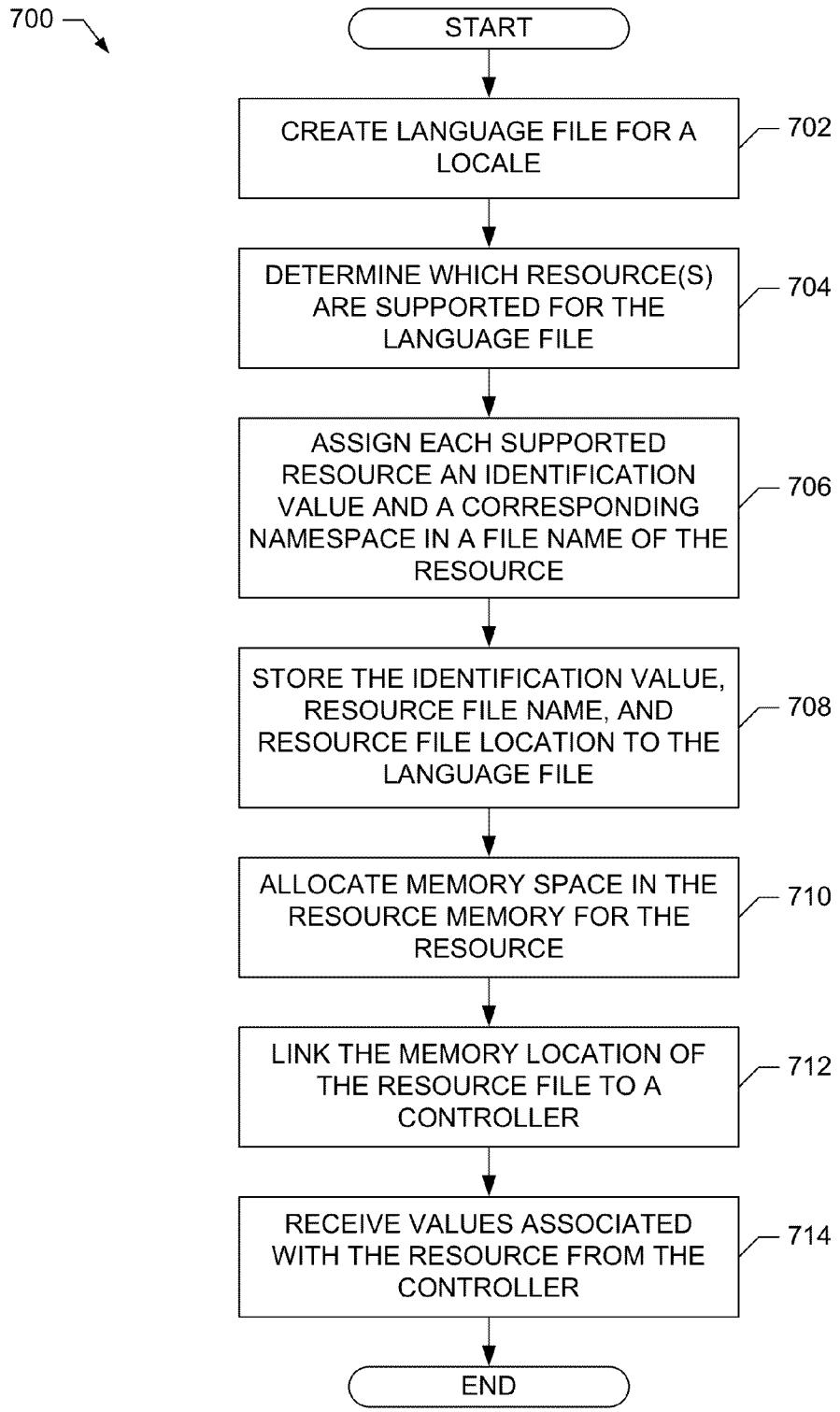

FIGS. 6A, 6B, and 7 are flowcharts of example methods that may be carried out to implement the example receiver 202, the example locale processor 204, the example language file database 206, the example resource processor 208, the example resource memory 119, the example resource manager 210, the example translator 212, the example resource queue 214, the example renderer 216, and/or more generally, the example resource locator 102 of FIGS. 1 and/or 2. The example methods of FIGS. 6A, 6B, and/or 7 may be carried out by a processor, a controller and/or any other suitable processing device. For example, the example methods of FIGS. 6A, 6B, and/or 7 may be embodied in coded instructions stored on any tangible (e.g., non-transitory) computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 8). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example methods of FIGS. 6A, 6B, and/or 7 may be implemented using any combination(s) of ASIC(s), PLD(s), FPLD(s), discrete logic, hardware, firmware, etc.

Also, some or all of the example methods of FIGS. 6A, 6B, and/or 7 may instead be implemented using manual operations or as any combination of any of the foregoing techniques, for example, any combination of firmware, software, discrete logic and/or hardware. Furthermore, many other methods of implementing the example operations of FIGS. 6A, 6B, and/or 7 may be employed. For example, the order of execution of the blocks may be changed, and/or one or more of the blocks described may be changed, eliminated, subdivided, or combined. Additionally, any or all of the example methods of FIGS. 6A, 6B, and/or 7 may be carried out sequentially and/or carried out in parallel by, for example, separate processing threads, processors, devices, discrete logic, circuits, etc.

The example method 600 of FIGS. 6A and 6B displays resources in an application based on a locale identifier and resource identifier(s) received from the application. Multiple example methods 600 may be executed in parallel or series to display resources within the application. Additionally, in examples where multiple applications request resources, an example method 600 may be implemented for each application or, alternatively, a single example method 600 may be implemented for all of the applications.

The example method 600 of FIG. 6A begins by receiving (e.g., via the receiver 202 of FIG. 2) an indication of a newly opened application in a user interface (block 602). Next, the example method 600 (e.g., via the receiver 202) receives a locale identifier and at least one resource identifier from the application (blocks 604 and 606). Alternatively, the example method 600 may begin by receiving the locale and resource identifiers. The example method 600 (e.g., via the locale processor 204) accesses the example language file database 206 of FIGS. 2 and/or 3 and determines if at least one language file corresponds to the received locale identifier (blocks 608 and 610).

If the example method 600 (via the locale processor 204) determines that the locale identifier does not matches a language file, the example method 600 of FIG. 6B accesses a default language file (block 618). The example method 600 (e.g., via the resource processor 208) may then access resource(s) included within and/or associated with the default language file (block 620). The accessed resources may include process control information and/or process control translation information.

However, if the example method 600 (via the locale processor 204) determines that the locale identifier matches a language file (block 610), the example method 600 accesses the matching language file (block 612). The example method 600 (e.g., via the locale processor 204) then determines if there is at least one resource, link to a resource, and/or listed resource within the matched language file that corresponds the received resource identifier(s) (block 614). For each resource identifier not matched by the example method 600 to a resource in the language file, the example method 600 (e.g., via the locale processor 204) accesses the default language file (block 618). For each resource identifier matched by the example method 600 to a resource in the language file, the example method 600 (e.g., via the resource processor 208) accesses a matching resource within the resource memory 119 specified by the language file (block 616). The example method 600 may match the resource identifier to a resource by comparing a namespace of a file name of the resource to the resource identifier and/or by using a link or reference to the resource included within the language file. The example method 600 may also combine a matched resource (e.g., process control information) accessed from the resource memory 119 with an associated resource (e.g., process control translation information) included within the language file and/or the resource memory 119).

The example method 600 of FIG. 6B continues by translating (e.g., via the translator 212 and/or the resource processor 208) accessed and/or combined resources (block 622). The example method 600 may also translate resources accessed via the default language file. Further, the example method 600 may format resources based on information within the associated language file. Next, the example method 600 (e.g., via the resource queue 214) queues the resources with other resources requested by the application (block 624). The example method 600 (e.g., via the resource processor 208 and/or the locale processor 204) then determines if the application has requested additional resources for display (block 626).

If the example method 600 determines that the application has requested additional resources, the example method 600 of FIG. 6A (e.g., via the receiver 202) receives resource identifier(s) associated with the requested resources (block 606). However, if the example method 600 determines that the application has not requested additional resources to be displayed and/or all requested resources for display are queued, the example method 600 (e.g., via the renderer 216) renders the resource(s) for display within the application (block 628). Next, the example method 600 (e.g., via the renderer) transmits the resource(s) to the application (block 630). The example method 600 then ends.

The example method 700 of FIG. 7 configures, links, and/or references resources between language files and the resource memory 119. The example method 700 may be implemented to create a new language file and/or link new resource(s) to a language file. Multiple example methods 700 may be executed in parallel or series to configures, links, and/or references resources. Additionally, in examples where multiple resources are configured, linked, and/or referenced, an example method 700 may be implemented for each resource or, alternatively, a single example method 700 may be implemented for all of the resources.

The example method 700 of FIG. 7 begins by creating a language (e.g., via the locale processor 204) file for a locale (block 702). In other examples, the example method 700 may store a remotely created language file. Next, the example method 700 (e.g., via the locale processor 204) determines which resource(s) are supported by the language file (block 704). The example method 700 may identify which resource(s) are supported for a language file based on information received from a process control engineer and/or designer. In other examples, the example method 700 may utilize a translation script and/or a translation table that specifies supported resources.

The example method 700 (e.g., via the locale processor 204) assigns each supported resource an identification value (e.g., resource identifier) and/or a namespace to a file name of the resource (block 706). In other words, the example method 700 creates a file name for a resource based the resource name. The example method 700 (e.g., via the locale processor 204) then stores the resource file name and/or resource identifier to the language file (block 708). Storing the resource file name may also include storing process control translation information to the language file associated with the resource.

The example method 700 of FIG. 7 continues by allocating memory (e.g., via the resource processor 208) in the resource memory 119 for the resource (block 710). Allocating memory may include linking the location within the resource memory 119 to the corresponding language file. The example method 700 may also allocate memory by specifying a file name of the resource based on the resource identifier and/or namespace of the resource stored in the language file. Next, the example method 700 (e.g., via the resource processor 208 and/or the resource manager) may link the memory location of the resource file location within the resource memory 119 to a controller (e.g., the controller 108 of FIGS. 1 and 2) (block 712).

The example method 700 may link the memory location by identifying a variable name and/or variable storage location within the controller and/or a routine of the controller and associating the variable name and/or storage location with the resource location within the memory 119. In some examples, the storage location within the resource memory 119 may be the same and/or include the same resource identifier and a variable name within the controller. The example method 700 (e.g., via the resource manager 210) may then receive resources (e.g., process control information from the controller and store the resources to an appropriate location within the resource memory 119 (block 714). The example method 700 then ends.

Figure 8:
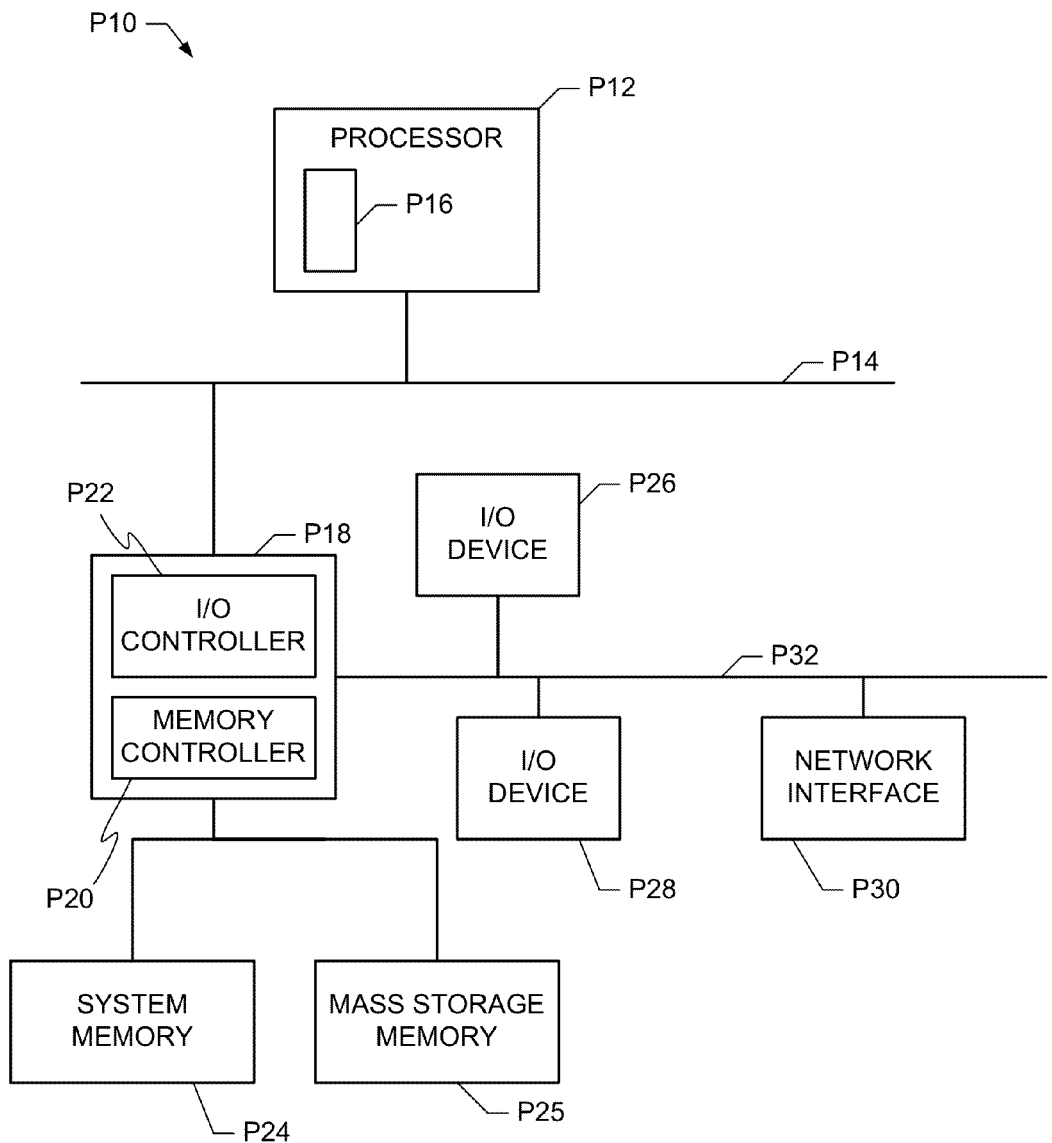
FIG. 8 is a block diagram of an example processor system that may be used to implement the example methods and apparatus described herein.

FIG. 8 is a block diagram of an example processor system P10 that may be used to implement the example methods and apparatus described herein. For example, processor systems similar or identical to the example processor system P10 may be used to implement the example receiver 202, the example locale processor 204, the example language file database 206, the example resource processor 208, the example resource memory 119, the example resource manager 210, the example translator 212, the example resource queue 214, the example renderer 216, and/or more generally, the example resource locator 102 of FIGS. 1 and/or 2. Although the example processor system P10 is described below as including a plurality of peripherals, interfaces, chips, memories, etc., one or more of those elements may be omitted from other example processor systems used to implement one or more of the example receiver 202, the example locale processor 204, the example language file database 206, the example resource processor 208, the example resource memory 119, the example resource manager 210, the example translator 212, the example resource queue 214, the example renderer 216, and/or more generally, the example resource locator 102.

As shown in FIG. 8, the processor system P10 includes a processor P12 that is coupled to an interconnection bus P14. The processor P12 includes a register set or register space P16, which is depicted in FIG. 8 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 8, the system P10 may be a multi-processor system and, thus, may include one or more additional processors that are identical or similar to the processor P12 and that are communicatively coupled to the interconnection bus P14.

The processor P12 of FIG. 8 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the language file database 206 and/or the resource memory 119 (FIG. 2), the mass storage memory P25 may include a hard disk drive, an optical drive, a tape storage device, etc. Alternatively, if the example processor system P10 is used to implement the language file database 206 and/or the resource memory 119, the mass storage memory P25 may include a solid-state memory (e.g., a flash memory, a RAM memory, etc.), a magnetic memory (e.g., a hard drive), or any other memory suitable for mass storage in the language file database 206 and/or the resource memory 119.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 8 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to display localized resources in process control applications, the method comprising:
receiving in a server a locale identifier and a resource identifier from an application;
identifying via the server a language file in a database that corresponds to the locale identifier;
determining via the server using the language file a first portion of a resource included within a memory that corresponds to the resource identifier;
accessing the first portion of the resource from the memory via the language file;
determining via the server using the language file a second portion of the resource within the language file or the memory that corresponds to the resource identifier;
accessing the second portion of the resource via the language file;
combining the first portion of the resource with the second portion of the resource; and
sending via the server the resource to the application to display a combination of the first portion and the second portion of the resource in a format associated with the locale identifier.

2. A method as defined in claim 1, further comprising:
receiving the first portion of the resource from a controller prior to receiving the locale identifier and the resource identifier; and
storing the first portion of the resource in the memory.

3. A method as defined in claim 1, wherein the locale identifier includes at least one of a language type, a country, a region, or a dialect.

4. A method as defined in claim 1, wherein the resource includes at least one of a process control value, a data value, an alarm, text, status information, diagnostic information, an error message, a parameter, an event, or a device identifier.

5. A method as defined in claim 1, wherein the locale identifier and the resource identifier are sent by the application during a rendering of the application.

6. A method as defined in claim 1, wherein the resource identifier includes a namespace that corresponds to at least a portion of a file name of the resource.

7. A method as defined in claim 6, wherein accessing the first portion of the resource from the memory includes matching the namespace to the file name of the first portion of the resource.

8. A method as defined in claim 1, further comprising translating the first portion or the second portion of the resource via the server using the language file.

9. A method as defined in claim 8, wherein translating the first portion or the second portion of the resource includes accessing a string corresponding to the resource identifier.

10. A method as defined in claim 8, wherein translating the first portion or the second portion of the resource includes converting the first portion or the second portion of the resource into at least one of a language or a format associated with the language file.

11. A method as defined in claim 1, further comprising receiving a request to change a locale of the application in the server prior to receiving the locale identifier and the resource identifier.

12. A method as defined in claim 1, further comprising:
accessing via the server a default language file if the language file does not include the first portion of the resource within the memory;
determining via the default language file the first portion of the resource included within a default memory that corresponds to the resource identifier; and
accessing the first portion of the resource from the default memory via the default language file.

13. A method as defined in claim 1, wherein the first portion of the resource comprises process control information and the second portion of the resource comprises process control translation information.

14. An apparatus to display localized resources in process control applications, the apparatus comprising:
a locale processor to identify a language file in a database that corresponds to a locale identifier transmitted by an application;
a resource processor to:
determine via the language file a first portion of a resource included within a memory that corresponds to a resource identifier transmitted by the application;
access the first portion of the resource from the memory via the language file;
determine via the language file a second portion of the resource included within one of the language file or the memory that corresponds to the resource identifier;
access the second portion of the resource from the one of the language file or the memory via the language file; and
combine the first portion of the resource with the second portion of the resource; and
a renderer to send the resource including a combination of the first portion and the second portion to the application.

15. An apparatus as defined in claim 14, further comprising a receiver to receive the locale identifier and the resource identifier from the application.

16. An apparatus as defined in claim 15, wherein the receiver is to receive the locale identifier and the resource identifier during a rendering of the application.

17. An apparatus as defined in claim 15, wherein the receiver is to receive a request to change a locale of the application prior to receiving the locale identifier and the resource identifier.

18. An apparatus as defined in claim 14, wherein the resource identifier includes a namespace that corresponds to at least a portion of a file name of the resource.

19. An apparatus as defined in claim 18, wherein the resource processor is to access the first portion of the resource from the memory by matching the namespace to the file name of the first portion of the resource.

20. An apparatus as defined in claim 14, further comprising a renderer to process the combination of the first portion and the second portion of the resource for display in the application in a format associated with the locale identifier.

21. An apparatus as defined in claim 14, further comprising a translator to translate the first portion or the second portion of the resource based on the language file.

22. An apparatus as defined in claim 21, wherein the translator is to translate the first portion or the second portion of the resource by accessing a string corresponding to the resource identifier included within the memory.

23. An apparatus as defined in claim 21, wherein the translator is to translate the first portion or the second portion of the resource by converting the first portion or the second portion of the resource into at least one of a language or a format associated with the language file.

24. An apparatus as defined in claim 14, wherein the locale processor is to access a default language file if the locale processor cannot identify the first portion of the resource within the memory via the language file.

25. An apparatus as defined in claim 24, wherein the resource processor is to:
determine via the default language file the first portion of resource included within a default memory that corresponds to the resource identifier; and
access the first portion of the resource from the default memory via the default language file.

26. A tangible machine readable storage medium having instructions stored thereon that, when executed, cause a machine to:
receive a locale identifier and a resource identifier from an application;
identify a language file in a database that corresponds to the locale identifier;
determine using the language file a first portion of a resource included within a memory that corresponds to the resource identifier;
access the first portion of the resource from the memory via the language file;
determine using the language file a second portion of the resource within the language file or the memory that corresponds to the resource identifier;
access the second portion of the resource via the language file;
combine the first portion of the resource with the second portion of the resource; and
send the resource to the application to display a combination of the first portion and the second portion of the resource in a format associated with the locale identifier.

* * * * *